Dec. 22, 1925.
S. TATAR
BEET HARVESTER
Filed Dec. 11, 1923
1,566,780
4 Sheets-Sheet 3
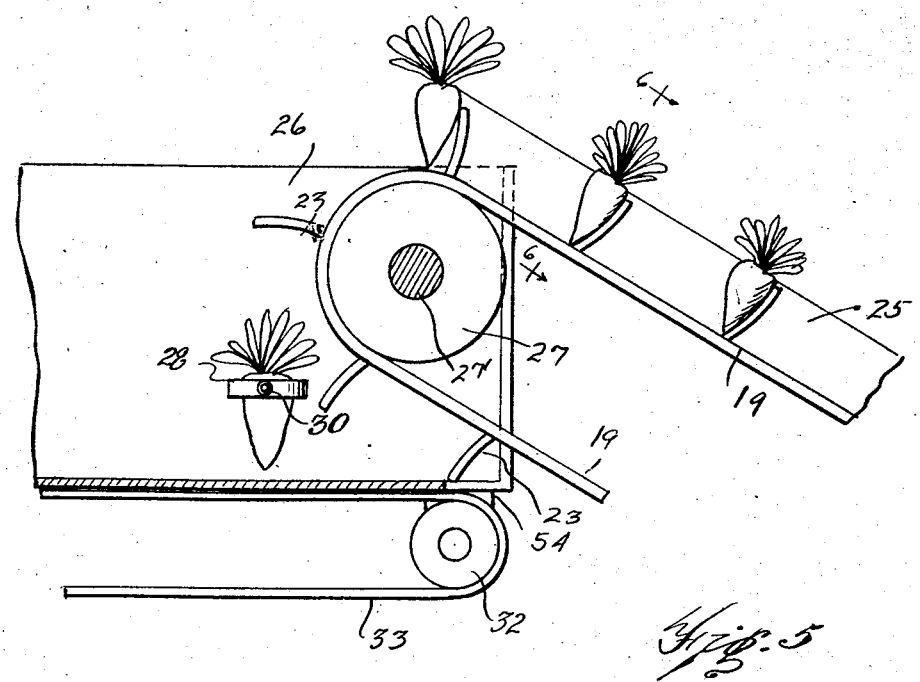
Fig. 5
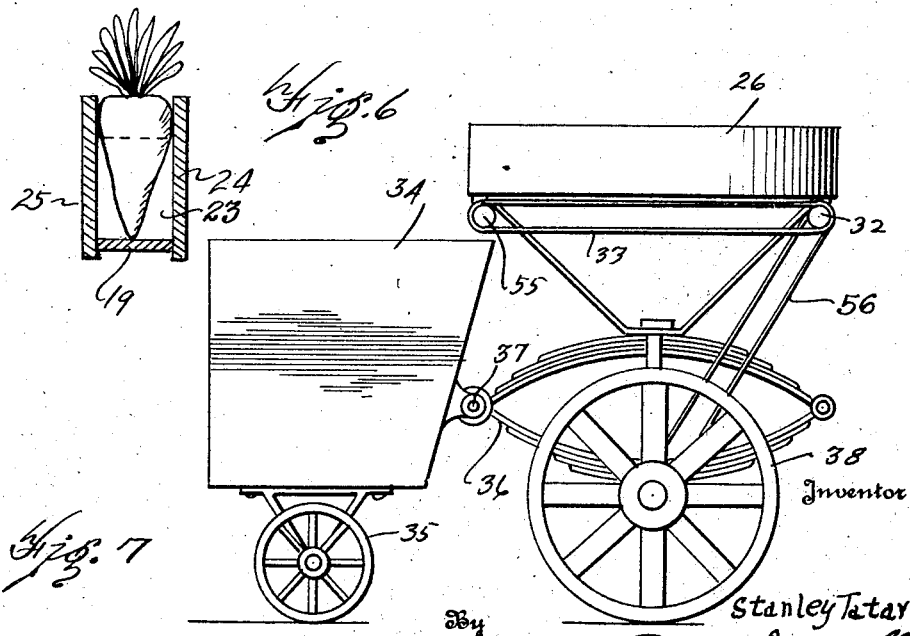
Fig. 6
Fig. 7
Inventor
Stanley Tatar
By Thos. J. Donnelly
Attorney Dec. 22, 1925.   1,566,780
S. TATAR
BEET HARVESTER
Filed Dec. 11, 1923   4 Sheets-Sheet 4
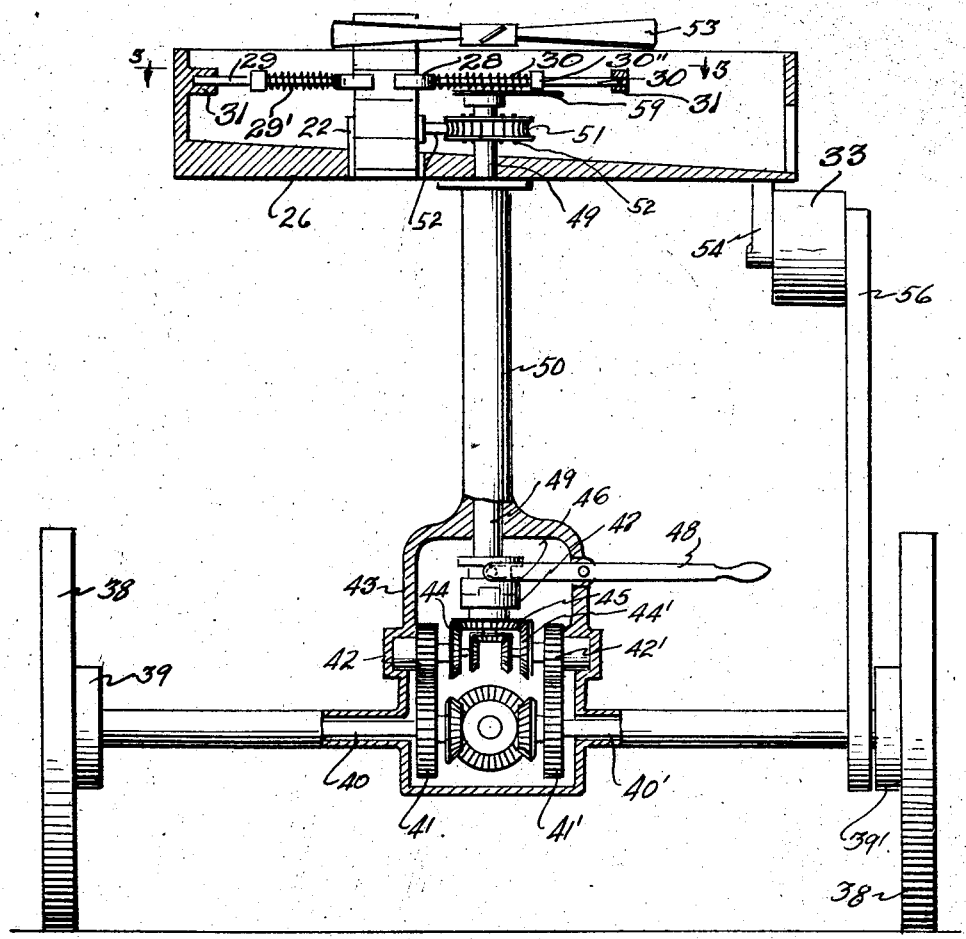
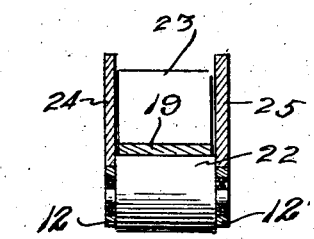
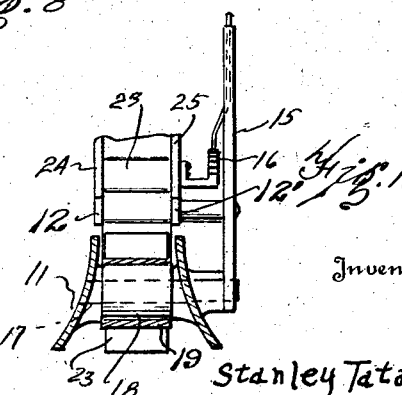
Inventor
Stanley Tatar
By
Attorney Patented Dec. 22, 1925.

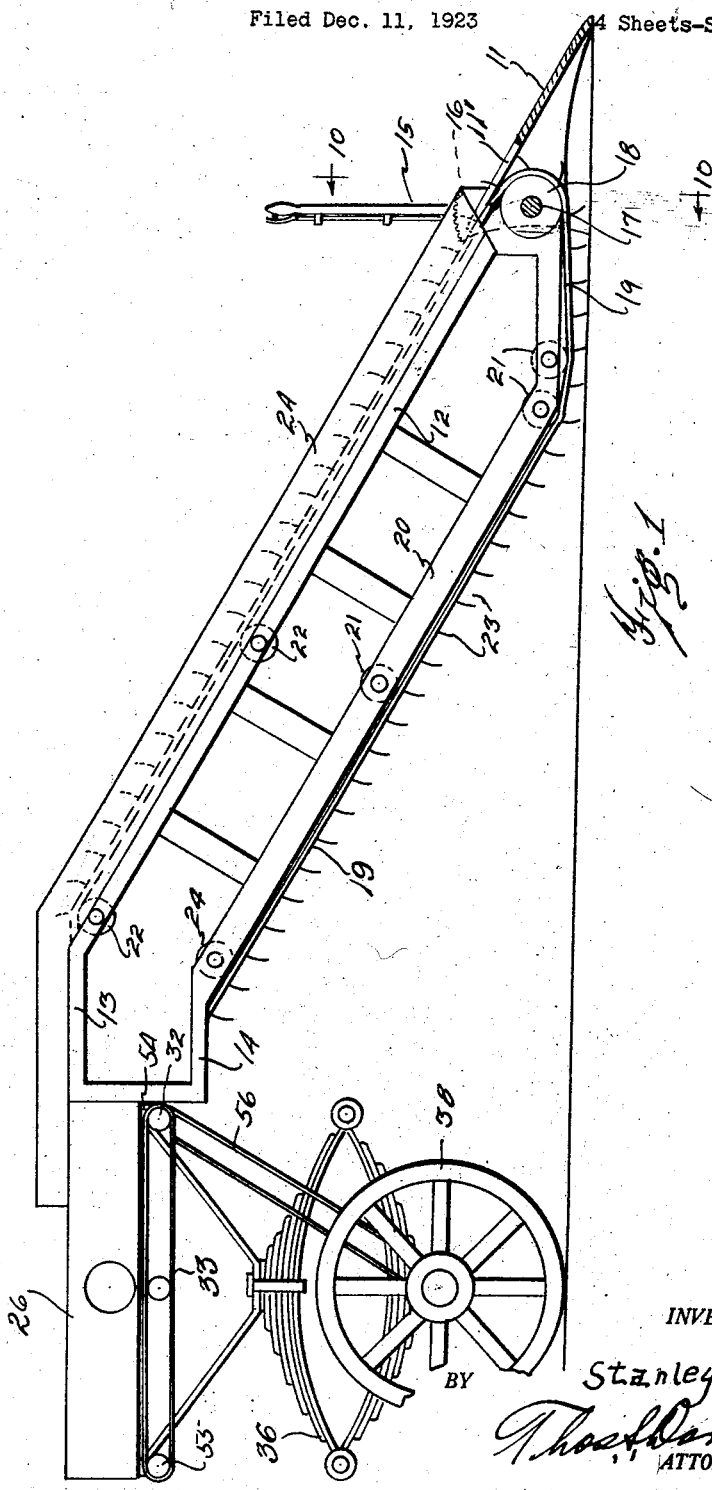

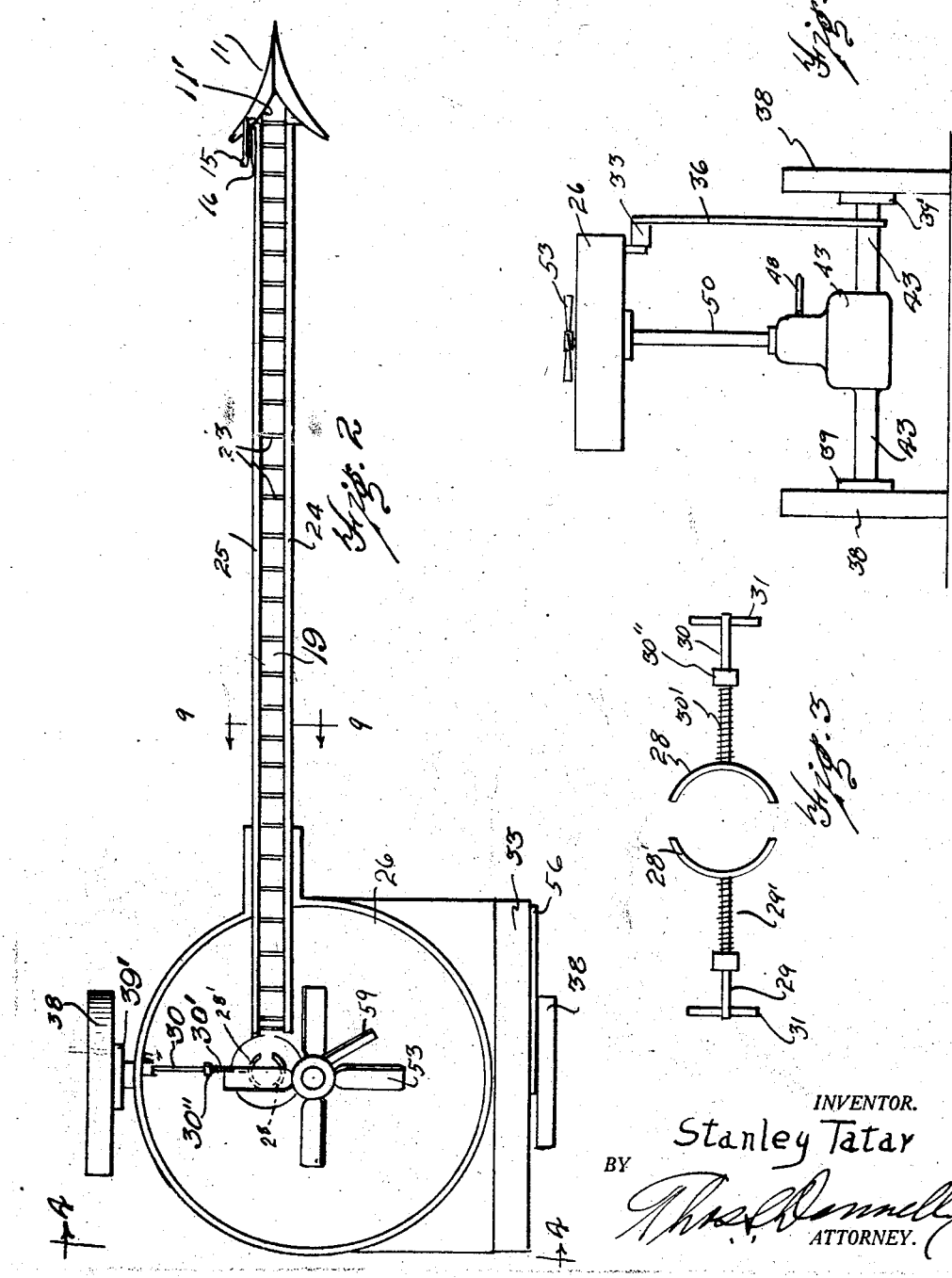

1,566,780

UNITED STATES PATENT OFFICE.

STANLEY TATAR, OF DETROIT, MICHIGAN.

BEET HARVESTER.

Application filed December 11, 1923. Serial No. 679,963.

*To all whom it may concern:*

Be it known that I, STANLEY TATAR, a citizen of the United States, residing at Detroit, in the county of Wayne and State of Michigan, have invented a new and useful Improvement in a Beet Harvester, of which the following is a specification.

My invention relates to a new and useful improvement in a beet harvester and has for its object the provision in a beet harvester of means for digging the beets and conveying them to a topping device in which the tops of the beets are removed and the beets conveyed to a hopper.

Another object of the invention is the provision in a beet harvester of a conveyor for conveying beets to a cutting device in a substantially upright position.

Another object of the invention is the provision in a beet harvester of means for holding the beat in an upright position during the time the top is being removed by the cutting element.

Another object of the invention is the provision in a beet harvester of a fan for carrying or driving away the tops of the beets when the same are cut off and means for driving the fan.

Other objects will appear hereinafter.

The invention consists in the combination and arrangement of parts hereinafter described and claimed.

The invention will be best understood by reference to the accompanying drawings which form a part of this specification and in which, Fig. 1 is a side elevational view of the invention, Fig. 2 is a top plan view of the invention, Fig. 3 is a view taken on substantially line 3—3 of Fig. 8, Fig. 4 is a sectional view taken on substantially line 4—4 of Fig. 2, Fig. 5 is a fragmentary side elevational view with parts in section illustrating operation of the conveyor in depositing the beets in topping position, Fig. 6 is a sectional view taken on substantially line 6—6 of Fig. 5, Fig. 7 is a side elevational view of the hopper used in the invention, Fig. 8 is an elevational view with parts in section illustrating the gearing used in the invention, Fig. 9 is a sectional view taken on substantially line 9—9 of Fig. 2, and, Fig. 10 is a sectional view taken on substantially line 10—10 of Fig. 1.

In the present invention the beets are removed from the ground by the digging element which is termed a plow and from this element conveyed by a suitable conveyor in substantially upright position, to a housing which contains a cutting element. The beets in passing from the conveyor to the cutting position are dropped into holding elements until a succeeding beet falls from the conveyor driving the previous beet down to an auxiliary conveyor which carries it to a hopper for containing the beets.

In the preferred form of construction, the digging element, or plow 11, is pivotally mounted on the forward end of beams 12 and 12' which are fixedly mounted to the framework of the vehicle on which the housing 26 is mounted. A lever 15 is attached to the plow 11 to afford means for regulating the pitch of the same, said lever carrying a spring-operated finger which engages teeth of a segment 16 to prevent undue movement of the plow 11. The ends of the beams 12 and 12' are provided with a horizontally extending portion 13 from which a portion extends downwardly to connect with another horizontally extending portion 14, thus forming substantially a U-shaped portion at the end of the attachment to the frame work and housing 26. Attached to the members 14 are beams 20 which are spaced apart sufficiently to carry between the same an endless conveyor 19 which engages at the lower end with a roller 18 mounted on a shaft 17, projected through the side members of the frame formed by the beams. Rotatably mounted between the beams 20 are rollers 21, said rollers being mounted on shafts which are journaled in the beams 20, suitable ball bearings being provided to reduce friction. Similar rollers 22 are mounted between the beams 12 and 12' each of these rollers engaging the conveyor 19 as it travels along.

Mounted on the outer surface of the conveyor are prongs 23, which are adapted to engage and retain in position the beets as the same are deposited thereon by the plow 11. Mounted on the beams 12 and 12', at opposite sides of the conveyor and sufficiently spaced apart to allow the passage of a beet between, are side boards 24 and 25 which extend well over the housing 26. As shown in Fig. 1, the surface of the plow 11 extends over the conveyor 19 a short distance, and is provided with an opening 11' to permit the passage of the prongs 23 therethrough. The beets, when being forced out of the ground by the plow 11, are forced rearwardly thereof as the plow travels through the ground, thus bringing the beets to the slot 11'. Here the prongs 23 engage the same and serve to carry it off on to the conveyor and off of the plow 11. In this way much of the dirt adhering to the beets is jarred loose and permitted to fall free of the conveyor through the slot 11'. The upper end of the conveyor 19, as shown in Fig. 5, engages a roller 27, which is mounted upon a shaft 27'. The beets, as carried up on the conveyor 19, are permitted to drop into the position shown in Fig. 5 and to engage between a pair of semi-circular retaining members 28 and 28'. The member 28 is mounted upon a shaft 30 which projects through the wall 31 of the housing 26. This rod is adapted for slidable movement and a spring 30' positioned thereon engages a stationary collar 30 which is spaced from a wall 31. This spring resists the movement of the member 28 away from the member 28'. The member 28' is similarly mounted on a rod 29 provided with a similarly operating spring 29'. As the beets drop between the members 28 and 28', they are held in an upright position and while in this upright position the tops are removed by a cutter 59 to be explained hereinafter. After the cutting operation, the succeeding beet falling from the conveyor 19 drives the beet positioned between the members 28 and 28' downwardly through the same on to a conveyor 33 which engages a roller 32. This conveyor serves to convey the beet to the hopper 34, which is mounted upon suitable wheels 35 and pivotally attached, as at 37, to a spring 36 of the framework which supports the housing 26' on the wheels 38. Mounted upon the wheels 38 are housings 39 and 39' containing suitable gearing for rotating the shafts 40 and 40' in unison with the wheels 38. Mounted upon the shafts 40 and 40' respectively are gear wheels 41 and 41' which mesh with respective gear wheels 42 and 42', suitably journaled in the casing 43. Mounted on the same shaft as the gears 42 and 42' are bevel gears 44 and 44' which mesh with a bevel gear 45 loosely mounted upon a shaft 49 provided with a clutch head 46 adapted to engage with a co-operating clutch head 47 which is fixedly mounted upon the shaft 49, operable by a pivotally mounted lever 48. Upon operation of the clutch 48, the shaft 49 is caused to rotate with the wheels or to remain stationary while the wheels 38 are rotating, depending upon whether or not the clutch is in operative or inoperative position. The shaft 49 extends through a support, or standard, 50 which is attached to the lower portion of the housing 26 centrally thereof at the undersurface of the same. Fixedly mounted upon the shaft 49 interiorly of the housing 26 is a worm wheel 51 adapted to mesh with a worm shaft 52 which projects through and is fixedly mounted in the roller 27. In this manner a rotation of the shaft 49 brings about a rotation of the roller 27 and consequently a movement of the conveyor 19. Mounted upon the shaft 49, above the worm gear 51, is an elongated arm 59 having the edge thereof sharpened to provide a cutting element for removing the tops of the beet as the same are brought into a proper position for cutting. Mounted upon the shaft 49 and adapted to rotate therewith, above the cutting element, is a fan 53.

Projecting downwardly from the housing 26, at one side thereof, is a supporting arm 54, in which is journaled a suitable shaft, having roller 32 mounted thereon. An extension of the shaft on which the roller 32 is mounted affords a suitable pulley for a belt 56 which passes around the pulley, adapted to rotate with a wheel 38. The construction is such that a rotation of the wheels 38 will bring about a traveling of the conveyor 33.

In operation, the device is pushed by a suitable power means, such as a tractor, and the plow 11, digging into the ground, raises the beets therefrom, causing them to pass on to the conveyor 19, as already described. As the beets drop into the holding members 28 and 28', the knife 59 serves to top the beets, cutting off a portion of the body of the beet, as it is desirable to have more than the green tops of the beet removed. The succeeding beet, falling upon the retainer will drive the topped beet on to the conveyor 33 so that a continuous operation is provided.

While I have illustrated and described the preferred form of structure, I do not wish to limit myself to the precise form of structure shown but desire to avail myself of such variations and modifications as come within the scope of the appended claims.

Having thus described my invention what I claim as new and desire to secure by Letters Patent is:

1. In a beet harvester, a housing; a pair of substantially semi-circular permanently horizontally aligned relatively movable retaining members, adapted for the reception of a beet between them; resilient means for normally maintaining said retaining members in closely approached position and permitting the relative withdrawal of the same against the tension of said resilient means; and a rotatable cutting member adapted for passage across the axis of the circle defined by said members for topping a beet retained by said members.

2. In a beet harvester, a housing; a pair of substantially semi-circular permanently horizontally aligned relatively movable retaining members, adapted for the reception of a beet between them; resilient means for normally maintaining said retaining members in closely approached position and permitting the relative withdrawal of the same against the tension of said resilient means; a rotatable cutting member adapted for passage across the axis of the circle defined by said members for topping a beet retained by said members; and a fan for moving said tops after the topping operation from engagement with said retaining members.

In testimony whereof I have signed the foregoing specification at Detroit, in the county of Wayne and State of Michigan.

STANLEY TATAR.